2,717,266

PRODUCTION OF PENTADECANEDIOIC ACID

Raymond U. Lemieux, Saskatoon, Saskatchewan, Canada, assignor to National Research Council, Ottawa, Ontario, Canada, a body corporate No Drawing. Application April 9, 1952, Serial No. 281,455

4 Claims. (Cl. 260—530)

This invention relates to the production of pentadecanedioic acid which is useful in the synthesis of the musk, cyclopentadecanone.

In accordance with the invention an alkyl ester of the ustilic acid 15, 16-dihydroxyhexadecanoic (I), pure or in admixture with esters of other ustilic acids are degraded and hydrolyzed to form pentadecanedioic acid (III).

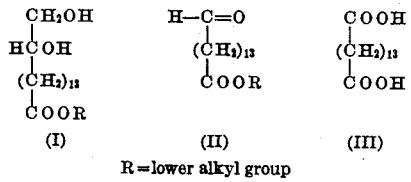

R = lower alkyl group

Cleavage of the terminal glycol of the ester (I) in acetic acid by one of a group of oxidizing agents comprising lead tetraacetate, lead tetraoxide and sodium bismuthate, yields an alkyl aldehydopentadecanoate (II) as disclosed in application, Serial Number 281,453 of even date herewith, which describes the treatment of the alkyl esters of 15, 16-dihydroxyhexadecanoic acid and 2, 15, 16-trihydroxyhexadecanoic acid to form alkyl esters of aldehydopentadecanoic acid and of 2-hydroxyaldehydopentadecanoic acid by dissolving the esters in acetic acid and treating with a glycol-splitting oxidant to form the esters of the respective aldehydo acids.

Treatment of the alkyl aldehydopentadecanoate (II) with an alkaline aqueous solution of hydrogen peroxide oxidizes the aldehyde group to carboxylic acid group and the alkaline conditions bring about saponification of the ester group to yield in solution pentadecanedioic acid in the form of its alkali metal salt. Decomposition of the salt with strong acid precipitates the pentadecanedioic acid from the solution.

The following examples illustrate the operation of the method:

1. Methyl ester of 15, 16-dihydroxyhexadecanoic acid (I), M. P. 84–85° C., 1.00 gm., was dissolved in 20 ml. of acetic acid and 2 gm. of lead tetraacetate was added. The reaction mixture was shaken in a stream of cold water for fifteen minutes, then left at room temperature for one hour. About 0.5 ml. of glycerol was added and the mixture was diluted with 20 ml. 30% ether in petroleum ether (30–40) and the resulting solution was poured into 50 ml. of water. After shaking, the water layer was withdrawn and washed once with 20 ml. of 30% ether in petroleum ether (30–40). The combined ether-petroleum ether extracts were washed four times with water, filtered and evaporated to a colourless oil which soon crystallized. The crystalline material, essentially pure methyl aldehydopentadecanoate, was suspended in 30 ml. of 3% hydrogen peroxide solution and a solution of one gm. of sodium hydroxide in 20 ml. of water was added. The resulting mixture was heated and kept at 65–70° C. with continuous vigorous shaking for fifteen minutes. The resulting solution was cooled to room temperature and filtered free of a faint turbidity. The clear filtrate was acidified with 3 ml. of concentrated hydrochloric acid and the precipitate which formed was collected by filtration and washed with water until free of strong acid. The air dried yield was 0.88 gm., 98% of theory. After two recrystallizations from ethyl acetate, the yield was 0.72 gm. of essentially pure pentadecanedioic acid, M. P. 113–114° C.

Sulphuric or nitric acid may be used instead of hydrochloric.

2. The crude methyl ustilate mixture, 5.00 gm., was dissolved in 50 ml. of glacial acetic acid and 9 gm. of lead tetraacetate was added. The mixture was shaken under the cold water tap until solution was complete and left at room temperature for one-half hour. About one ml. of glycerol was added followed by 100 ml. of Skellysolve F and resulting solution was poured into 250 ml. of cold water. After shaking the aqueous layer was separated and extracted with 50 ml. of Skellysolve F. The Skellysolve extracts were combined and washed with 50 ml. amounts of water until the aqueous extract was neutral; four extracts were required. The Skellysolve solution was filtered and evaporated, in vacuo, to yield the mixture of aldehydes. Sodium hydroxide, 5 gm., was dissolved in 100 ml. of water and this solution was added to 150 ml. of 3% hydrogen peroxide solution. The alkaline peroxide solution was heated to 70° C. and poured into the mixture of aldehydes. The resulting mixture was shaken vigorously and kept at 65° C. for fifteen minutes. The solution was cooled in a stream of cold water and filtered free of a faint turbidity. The filtrate was made strongly acid by the addition of hydrochloric acid and the precipitate was gathered by filtration and washed with water. The air dried product was dissolved in 35 ml. of boiling ethyl acetate and allowed to cool at room temperature. Crystallization was rapid and after one-half hour, the precipitate was collected by filtration. The yield was 2.02 gm., M. P. 103–108° C. The material was dissolved in 15 ml. of boiling ethyl acetate and the filtered solution was seeded with pentadecanedioic acid. The solution was left at room temperature and the crystals which had deposited after one hour, 1.52 gm., M. P. 109–111° C., were essentially pure pentadecanedioic acid.

3. Methyl ustilate of 15, 16-dihydroxyhexadecanoic acid (I), 6.00 gm., was dissolved in 50 ml. of acetic acid and the solution was heated to 55–65° C. While maintaining the temperature within this range, 16.0 gm. of red lead ($Pb_3O_4$), 50 mesh, was added in one gm. portions with continuous stirring. Each portion was added only after the previous addition had completely decolourized. After the last portion was added, the heating and stirring were continued for fifteen minutes. The reaction mixture was diluted with 100 ml. of Skellysolve C and the resulting solution was poured into water. The Skellysolve C layer was washed free of acids and evaporated to the methyl aldehydopentadecanoate which was oxidized with alkaline hydrogen peroxide solution to yield pentadecanedioic acid as described in Example 1.

I claim:

1. In the production of pentadecanedioic acid its esters and salts the method which comprises treating an ester of 15, 16-dihydroxyhexadecanoic acid in acetic acid solution with an oxidizing agent from the group consisting of lead tetraacetate, lead tetraoxide and sodium bismuthate to form an aldehyde and treating the aldehyde with an aqueous alkaline solution of hydrogen peroxide to form pentadecanedioic acid.

2. In the production of pentadecanedioic acid its esters and salts the method which comprises treating the methyl ester of 15, 16-dihydroxyhexadecanoic acid in an acetic acid solution with lead tetraacetate, adding petrolic ether and water to the solution to extract the methyl aldehydopentadecanoate and treating the latter with an aqueous solution of an alkali metal hydroxide and hydrogen peroxide to form the alkali metal salt.

3. The method defined in claim 2 wherein the solutions containing the alkali metal salt formed is treated with an acid from the group consisting of hydrochloric, sulphuric and nitric to form pentadecanedioic acid.

4. In the production of pentadecanedioic acid, its esters or salts, the method which comprises treating an alkyl ester of aldehydopentadecanoic acid with an aqueous alkaline solution of hydrogen peroxide and treating the product with a strong acid to form pentadecanedioic acid.

References Cited in the file of this patent

Houben: Die Methoden der Organischem Chemie, 3rd ed., vol. 2, page 33.

Chem. Abst. 34: 7850[7] to 7851[3] (1940).

Chem. Abst. 43: 3776[a–c] (1949).